(12) United States Patent
Ichikawa et al.

(10) Patent No.: US 8,378,628 B2
(45) Date of Patent: Feb. 19, 2013

(54) PLUG CONVERSION ADAPTOR

(75) Inventors: Shinji Ichikawa, Toyota (JP); Kenji Itagaki, Toyota (JP); Masaru Sasaki, Toyota (JP); Wanleng Ang, Okazaki (JP); Kenji Murasato, Toyota (JP); Atsushi Mizutani, Toyota (JP); Yukihiro Yamamoto, Okazaki (JP); Taira Kikuchi, Toyota (JP); Yoshikazu Kataoka, Toyota (JP); Shingo Ieda, Nagoya (JP); Hiroki Sawada, Toyota (JP); Yoshinori Fujitake, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/120,332

(22) PCT Filed: Feb. 26, 2009

(86) PCT No.: PCT/JP2009/053522
§ 371 (c)(1),
(2), (4) Date: Mar. 22, 2011

(87) PCT Pub. No.: WO2010/097922
PCT Pub. Date: Sep. 2, 2010

(65) Prior Publication Data
US 2011/0300753 A1    Dec. 8, 2011

(51) Int. Cl.
*H02J 7/00* (2006.01)
(52) U.S. Cl. .................................. 320/109; 439/620.21
(58) Field of Classification Search .................. 320/109; 439/620.21
See application file for complete search history.

(56) References Cited

U.S. PATENT DOCUMENTS

| 5,369,352 | A | 11/1994 | Toepfer et al. | |
|---|---|---|---|---|
| 6,358,096 | B1 * | 3/2002 | Beckman | 439/638 |
| 6,937,490 | B2 * | 8/2005 | MacDonald et al. | 363/142 |
| 6,972,975 | B2 * | 12/2005 | Su | 363/146 |
| 7,422,473 | B2 * | 9/2008 | Portwood | 439/501 |
| 7,642,671 | B2 * | 1/2010 | Mahaffey | 307/12 |
| 8,030,882 | B2 * | 10/2011 | Ito et al. | 320/104 |

FOREIGN PATENT DOCUMENTS

| JP | A-07-007860 | 1/1995 |
|---|---|---|
| JP | A-07-037644 | 2/1995 |
| WO | WO 2009/034883 A1 | 3/2009 |

OTHER PUBLICATIONS

International Search Report issued in International Patent Application No. PCT/JP2009/053522 dated Apr. 28, 2009 (with translation).

* cited by examiner

*Primary Examiner* — Ramy Ramadan
(74) *Attorney, Agent, or Firm* — Oliff & Berridge, PLC

(57) ABSTRACT

A conversion adaptor enables utilization of a standardized charge cable used when a power storage device mounted on an electrically-powered vehicle is charged by a power source provided outside of the vehicle as a universal cable for transmitting electric power to electric loads having different plug shapes that are respectively standardized from one region to another. Conversion adaptor includes a primary side connector unit configured to be connectable to a connector of charge cable, a secondary side connector unit configured so as to have a plug of an electric load, such as a home electric appliance, connected thereto, and a manipulating unit for manipulating a CCID of charge cable so that relays are switched off when connector of charge cable is connected to first connector unit.

8 Claims, 12 Drawing Sheets

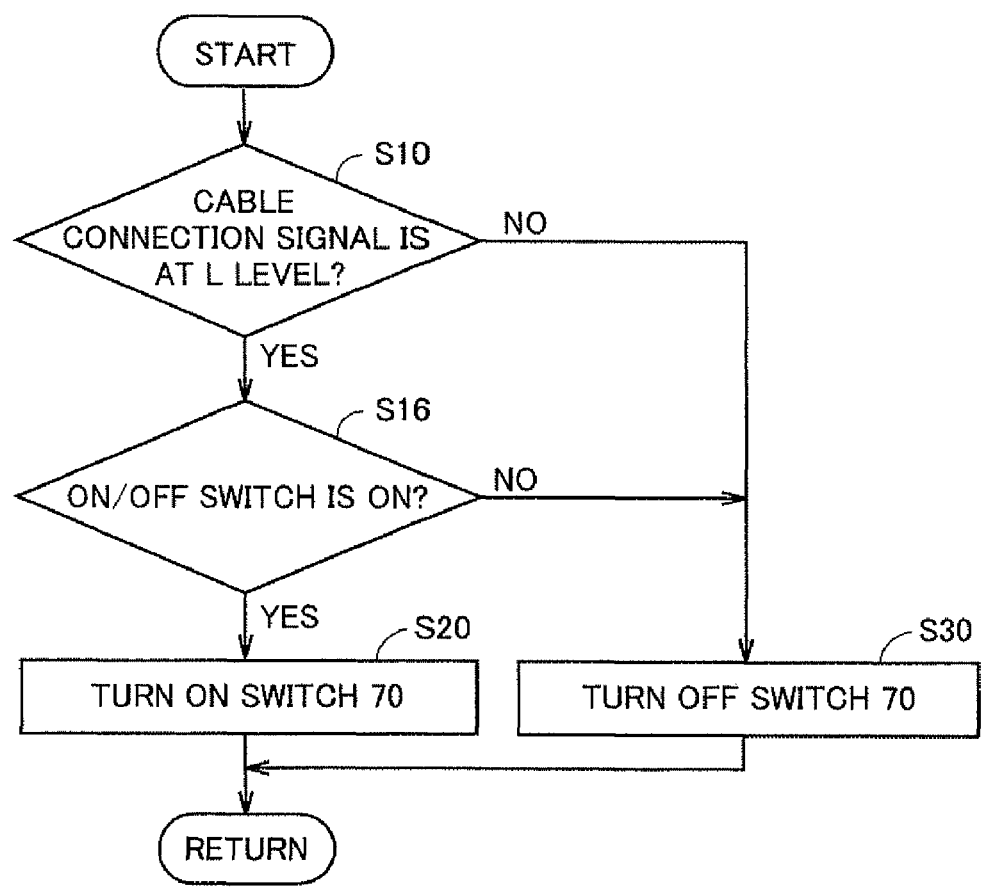

PLUG CONVERSION ADAPTOR

TECHNICAL FIELD

The present invention relates to a plug conversion adaptor for enabling utilization of a standardized charge cable used when a power storage device mounted on an electrically-powered vehicle is charged by a power source provided outside of the vehicle as a universal cable for transmitting electric power to electric loads having different plug shapes respectively standardized from one region to another.

BACKGROUND ART

Japanese Patent Laying-Open No. 7-37644 (Patent Document 1) recites an electric vehicle charging connector for charging a battery mounted on an electric vehicle using a power source provided outside of the vehicle. The electric vehicle charging connector is detachably attached to a vehicle connector provided in a body of the electric vehicle to charge the vehicle (see the Patent Document 1).
Patent Document 1: Japanese Patent Laying-Open No. 7-37644
Patent Document 2: Japanese Patent Laying-Open No. 7-7860

DISCLOSURE OF THE INVENTION

Problems to be Solved by the Invention

A charger system for charging a battery mounted on an electric vehicle using an outside power source was standardized by, for example, SAE (Society of Vehicle Engineers), USA, and Japan Electric Vehicle Association. The standards set by these organizations lay down constructions of a charge cable and a connector of the charge cable and a vehicle inlet to which the charge cable are connected, and constructions associated with a control pilot.

A charge cable for an electrically-powered vehicle, if available as a universal cable for transmitting electric power to electric loads such as electric home appliances, can improve its serviceability for users. If the charge cable can be used as an extension cable when a vehicle is cleaned in a garage, for example, it becomes unnecessary to separately purchase the extension cable, which is convenient for users. However, there are standards already set for the charge cable for electrically-powered vehicle, and it is not possible to directly use the charge cable as the universal cable.

The present invention was carried out to deal with the conventional disadvantage described above, and a main object thereof is to provide a plug conversion adaptor for enabling utilization of a standardized charge cable used when a power storage device mounted on an electrically-powered vehicle is charged by a power source provided outside of the vehicle as a universal cable for transmitting electric power to electric loads having different plug shapes respectively standardized from one region to another.

Means for Solving the Problems

A plug conversion adaptor according to the present invention is a plug conversion adaptor for enabling utilization of a standardized charge cable used when a power storage device mounted on an electrically-powered vehicle is charged by a power source provided outside of the vehicle as a universal cable for transmitting electric power to electric loads having different plug shapes respectively standardized from one region to another. The charge cable includes a power cutoff device configured to be controllable by a controller mounted on the electrically-powered vehicle. The plug conversion adapter includes first and second connector units and a manipulating unit. The first connector unit is configured to be connectable to a connector of the charge cable, and the second connector unit is configured to receive a plug of an electric load. The manipulating unit manipulates the power cutoff device to shift to a non-cutoff state when the connector of the charge cable is connected to the first connector unit.

The power cutoff device preferably includes a relay provided in an electric power line and an EVSE controller. The EVSE controller is configured to generate a standardized pilot signal and output the generated pilot signal to the electrically-powered vehicle by way of the charge cable. The manipulating unit includes a resistor circuit and a controller. The resistor circuit is connected to a control pilot line to which the pilot signal is transmitted, and is configured to be able to change a potential of the pilot signal. The controller controls the resistor circuit so as to change the potential of the pilot signal to be different to a potential thereof in a disconnected state when the connector of the charge cable is connected to the first connector unit. The EVSE controller switches on the relay upon detection of the potential change of the pilot signal resulting from the connection of the connector of the charge cable to the first connector unit.

Preferably, the charge cable further includes a signal generator. The signal generator generates a connection signal indicating the connection state of the connector. The controller receives the connection signal, and determines whether or not the connector of the charge cable is connected to the first connector unit based on the connection signal thereby received.

Preferably, the controller determines whether or not the connector of the charge cable is connected to the first connector unit based on whether or not the pilot signal is detected.

Preferably, the plug conversion adaptor further includes a current detector. The current detector detects a current inputted from the first connector unit. The manipulating unit manipulates the power cutoff device so as to shift to a cutoff state in response to detection of an overcurrent based on the current detected by the current detector.

More preferably, the charge cable further includes a lock mechanism for locking the connection of the connector. When the lock by the lock mechanism is released, the manipulating unit manipulates the power cutoff device so as to shift to the cutoff state.

More preferably, the plug conversion adaptor further includes a switch which can be turned on/off by a user. The manipulating unit manipulates the power cutoff device so as to shift to the non-cutoff state when the connector of the charge cable is connected to the first connector unit and the switch is turned on.

More preferably, the plug conversion adapter further includes a relay configured to enable electric power inputted from the first connector unit to be cut off. The manipulating unit switches on the relay when the connector of the charge cable is connected to the first connector unit.

Effects of the Invention

In the plug conversion adaptor, the first connector unit is connected to the connector of the standardized charge cable, and the electric load plug differently formed according to regionally different standards is connected to the second connector unit. The charge cable includes the power cutoff device configured to be controllable by the controller mounted on the electrically-powered vehicle. According to the plug conversion adaptor, the power cutoff device is shifted to the non-cutoff state by the manipulating unit when the connector of the charge cable is connected to the first connector unit, enabling electrical conduction of the charge cable.

According to the plug conversion adapter, the standardized charge cable used to charge the power storage device mounted on the electrically-powered vehicle using the power source provided outside of the vehicle can be utilized as a universal cable for transmitting electric power to electric loads having different plug shapes that are respectively standardized in different regions.

BRIEF DESCRIPTION OF THE DRAWINGS

FIG. 14 is a flow chart of a control operation by ECU illustrated in FIG. 13.

Figure 1:
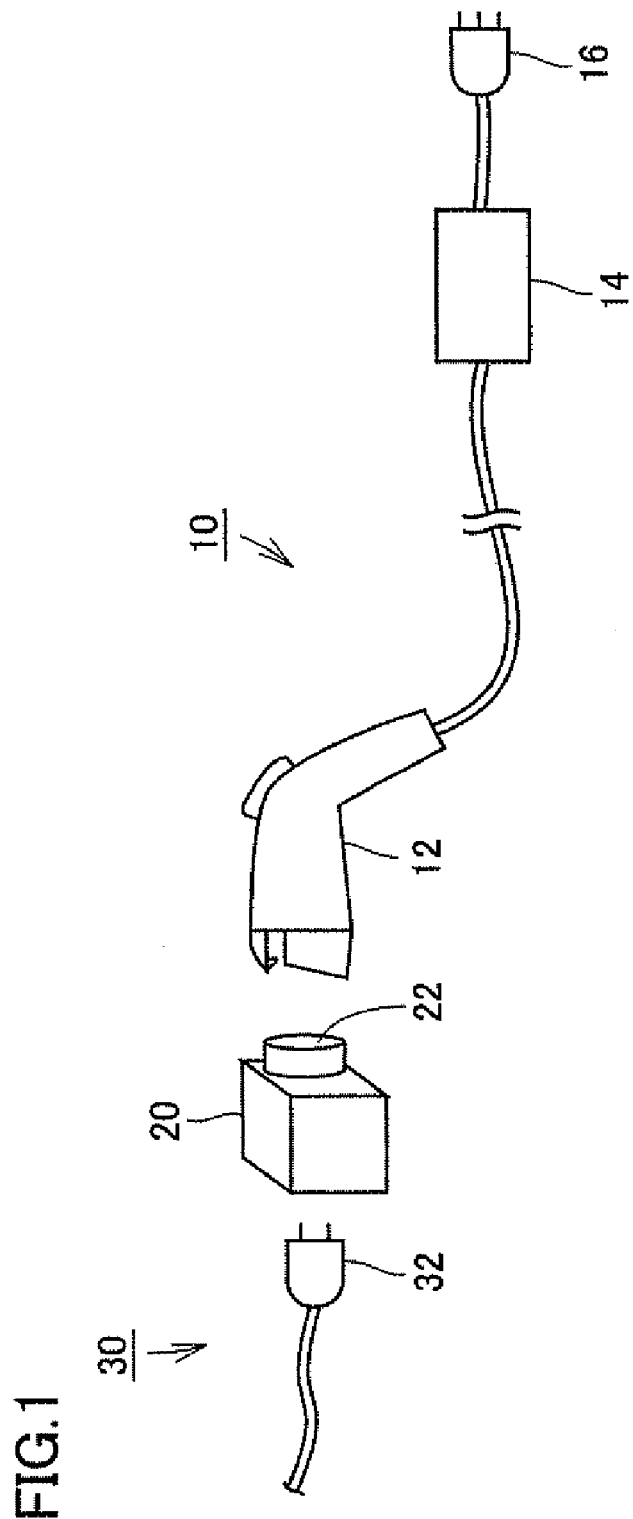
FIG. 1 is an illustration of a state of a conversion adaptor according to the present invention in use.

DESCRIPTION OF THE REFERENCE SIGNS 10, 10A charge cable, 12 connector, 14 CCID, 16, 32 plug, 20, 20A to 20D conversion adaptor, 22 primary side connector unit, 24 secondary side connector unit, 30 power supply code, 41, 46 HOT contact point, 42, 47 COLD contact point, 43, 48 GND contact point, 44 connection signal contact point, 45 pilot signal contact point, 46 limit switch, 50 EVSE controller, 52 oscillator, 54, 62, 66, 68 resistor element, 56 voltage sensor, 58 electromagnetic coil, 60, 60A to 60D manipulating unit, 65 resistor circuit, 70 switch, 72, 72 to 72D ECU, 74 power source node, 76 ground node, 78 current sensor, 80 on/off switch, 90 power source, RY1, RY2 relay, L1 connection signal line, L2 control pilot line

BEST MODES FOR CARRYING OUT THE INVENTION

Hereinafter, preferred embodiments of the present invention are described in detail referring to the drawings. In the drawings, the same or corresponding constitutive elements are simply given the same reference symbols to avoid redundant description.

First Embodiment

FIG. 1 is an illustration of a state of a conversion adaptor according to the present invention in use. Referring to FIG. 1, a charge cable 10 is used to charge a power storage device, for example, a secondary battery or a capacitor, mounted on an electrically-powered vehicle such as an electric vehicle or a hybrid vehicle using a power source provided outside of the vehicle (not shown, the same shall apply hereinafter in this description). Charge cable 10 is pursuant to standards set by such organizations as SAE, USA, and Japan Electric Vehicle Association.

Charge cable 10 includes a connector 12, a CCID (Charging Circuit Interrupt Device) 14, and a plug 16, Connector 12 is formed to be fittable into a vehicle inlet (charge port) provided in the electrically-powered vehicle. CCID 14 is a power cutoff device to be controlled by a controller mounted on the electrically-powered vehicle when connector 12 is connected to the vehicle inlet. Plug 16 is formed to be fittable into a power supply socket not shown.

A conversion adaptor 20 enables standardized charge cable 10 to be available as a universal cable for transmitting electric power to electric loads such as electric home appliances. A primary side connector unit 22 of conversion adaptor 20 is formed to be fittable into connector 12 of charge cable 10. A secondary side connector unit thereof, not shown in the drawing, is formed so as to have a plug 32 of a power supply code 30 as an electric load fitted thereto.

Figure 2:
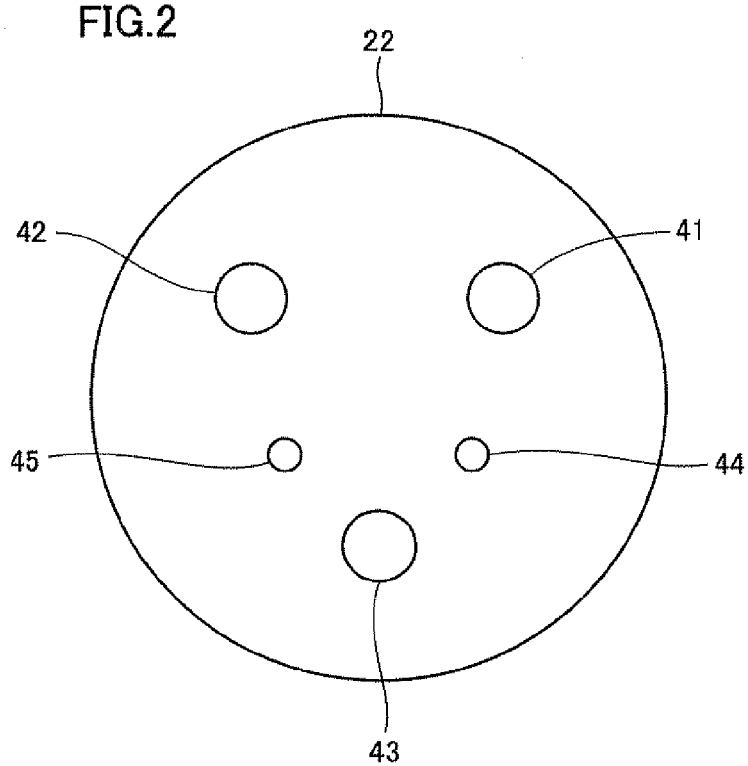
FIG. 2 is a view illustrating a construction of a primary side connector unit of the conversion adaptor of FIG. 1.

FIG. 2 is a view illustrating a construction of primary side connector unit 22 of conversion adapter 20 of FIG. 1. Referring to FIG. 2, primary side connector unit 22 includes a HOT contact point 41, a COLD contact point 42, a GND contact point 43, a connection signal contact point 44 and a pilot signal contact point 45. The construction of primary side connector unit 22 corresponds to the construction of connector 12 of standardized charge cable 10 (FIG. 1). A description will be given later to a cable connection signal PISW to be inputted to connection signal contact point 44 and a pilot signal CPLT to be inputted to pilot signal contact point 45.

Figure 3:
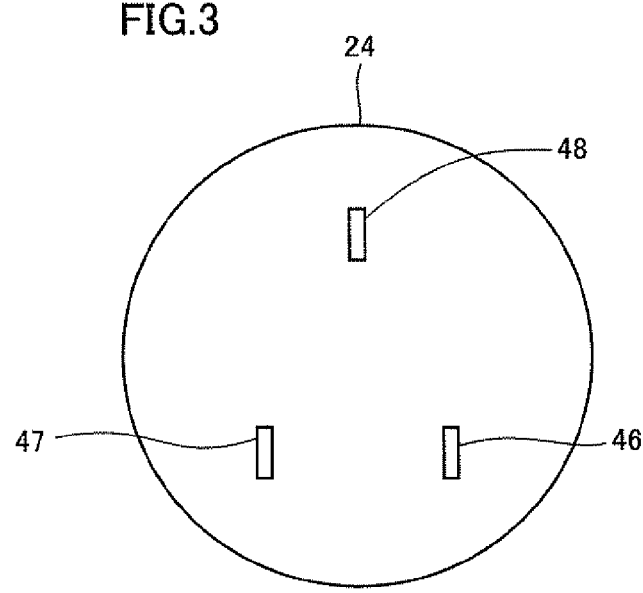
FIG. 3 is a view illustrating a construction of a secondary side connector unit of the conversion adaptor of FIG. 1.

FIG. 3 is a view of a construction of the secondary side connector unit of conversion adaptor 20 illustrated in FIG. 1. Referring to FIG. 3, secondary side connector unit 24 includes a HOT contact point 46, a COLD contact point 47 and a GND contact point 48. The construction of secondary side connector unit 24 corresponds to the construction of plug 32 (FIG. 1) of power supply code 30 regionally standardized (for example, by country).

Figure 4:
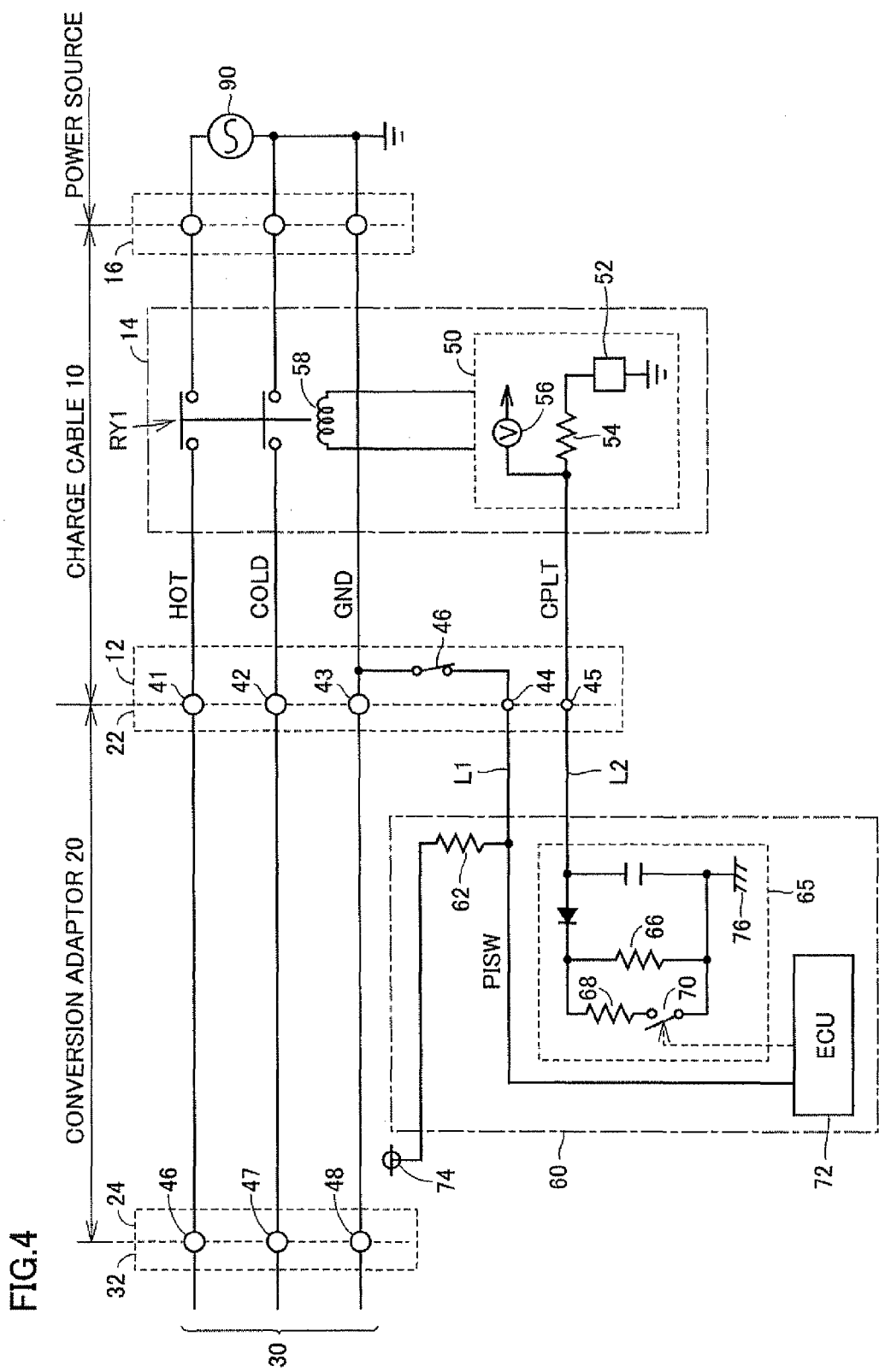
FIG. 4 is a diagram illustrating constructions of a charge cable and the conversion adapter of FIG. 1.

FIG. 4 is a diagram illustrating constructions of charge cable 10 and conversion adapter 20 of FIG. 1. Referring to FIG. 4, CCID 14 of charge cable 10 includes relays RY1, an EVSE (Electric Vehicle Supply Equipment) controller 50, and an electromagnetic coil 58, Relays RY1 are respectively provided on a HOT line and a COLD line, Relays RY1 are switched on or off by electromagnetic coil 58 electrically conducted by EVSE controller 50. When relays RY1 are switched off, electric power inputted from plug 16 is cut off. When relays RY1 are switched on, electric power inputted from plug 16 is supplied to connector 12.

EVSE controller 50 includes an oscillator 52, a resistor element 54 and a voltage sensor 56. Oscillator 52 is activated by electric power supplied from a power source 90 when plug 16 is connected to power source 90, and oscillates with a duty cycle set in advance based on a rated current that can be electrically conducted to charge cable 10. A signal outputted from oscillator 52 is outputted as pilot signal CPLT to pilot signal contact point 45 by way of resistor element 54.

Voltage sensor 56 detects a potential of pilot signal CPLT. When the potential of pilot signal CPLT detected by voltage sensor 56 is equal to a potential V1, there is no power supply to electromagnetic coil 58, therefore, relays RY1 are switched off. When the potential of pilot signal CPLT detected by voltage sensor 56 is equal to a regular potential V2 lower than potential V1, relays RY1 are switched on so that electric power is supplied to electromagnetic coil 58.

The potential of pilot signal CPLT is controlled pursuant to standards by the controller of the electrically-powered vehicle when charge cable 10 is used for charging the electrically-powered vehicle. However, the potential of pilot signal CPLT is manipulated by a manipulating unit 60 (described later) of conversion adaptor 20 when conversion adapter 20 is connected to charge cable 10 so that charge cable 10 is used as a universal cable.

Connector 12 of charge cable 10 includes a limit switch 46. Limit switch 46 is connected to between the GND line and connection signal contact point 44. Limit switch 46 is turned on when connector 12 is connected to the counterpart connector, and a potential of connection signal contact point 44 is pulled down to a ground potential when limit switch 46 is turned on.

Plug 16 is connected to, for example, a power source socket provided in a house. The power source socket is supplied with an alternate current from power source 90 (for example, system power source for commercial use).

Conversion adaptor 20 includes manipulating unit 60 other than primary side connector unit 22 and secondary side connector unit 24 described earlier. Manipulating unit 60 includes a resistor element 62, a resistor circuit 65, and an ECU (Electronic Control Unit) 72. Resistor element 62 is connected to between a power source node 74 and a connection signal line L1 provided between connection signal contact 44 and ECU 72. When limit switch 46 of connector 12 is turned off (when primary side connector unit 22 and connector 12 are disconnected), resistor element 62 pulls up a potential of connection signal line L1 to a potential higher than the ground potential. When limit switch 46 of connector 12 is flipped on (when primary side connector unit 22 and connector 12 are connected to each other), the potential of connection signal line L1 becomes equal to the ground potential. More specifically, cable connection signal PISW on connection signal line L1 is at H (logic high) level when primary side connector unit 22 and connector 12 are disconnected, while cable connection signal PISW shifts to L (logic low) level when primary side connector unit 22 and connector 12 are connected to each other.

Resistor circuit 65 includes resistor elements 66 and 68, and a switch 70. Resistor element 66 is connected to between a control pilot line L2 to which pilot signal CPLT is transmitted and a ground node 76. Resistor element 68 and switch 70 are connected in series to between control pilot line L2 and ground node 76, and connected in parallel to resistor element 66. Switch 70 is flipped on or off in response to a control signal from ECU 72.

Resistor circuit 65 can change the potential of pilot signal CPLT on control pilot line L2. More specifically, when switch 70 is flipped off, resistor circuit 65 changes the potential of pilot signal CPLT to regular potential V1 that depends on voltage division by resistor elements 54 and 66. When switch 70 is flipped on, resistor circuit 65 changes the potential of pilot signal CPLT to regular potential V2 (<V1) that depends on voltage division by resistor elements 54, 66 and 68.

ECU 72 receives cable connection signal PISW. When cable connection signal PISW is at H level, in other words, when conversion adaptor 20 is not connected to charge cable 10, ECU 72 turns off switch 70. When cable connection signal PISW is at L level, in other words, when cable connection signal 20 is connected to charge cable 10, ECU 72 turns on switch 70.

Manipulating unit 60 controls the potential of pilot signal CPLT. More specifically, cable connection signal PISW is at H level when conversion adaptor 20 is not connected to charge cable 10, and ECU 72 turns off switch 70. Then, the potential of pilot signal CPLT becomes equal to potential V1 that depends on voltage division by resistor element 54 of EVSE controller 50 and resistor element 66 of resistor circuit 65. When conversion adaptor 20 is connected to charge cable 10, cable connection signal PISW shifts to L level, and ECU 72 turns on switch 70. Then, the potential of pilot signal CPLT becomes equal to potential V2 (<V1) that depends on voltage division by resistor element 54 of EVSE controller 50 and resistor elements 66 and 68 of resistor circuit 65. Then, the potential of pilot signal CPLT is detected by CCID 14 of charge cable 10 as described earlier, and relays RY1 are accordingly manipulated by CCID 14.

Figure 5:
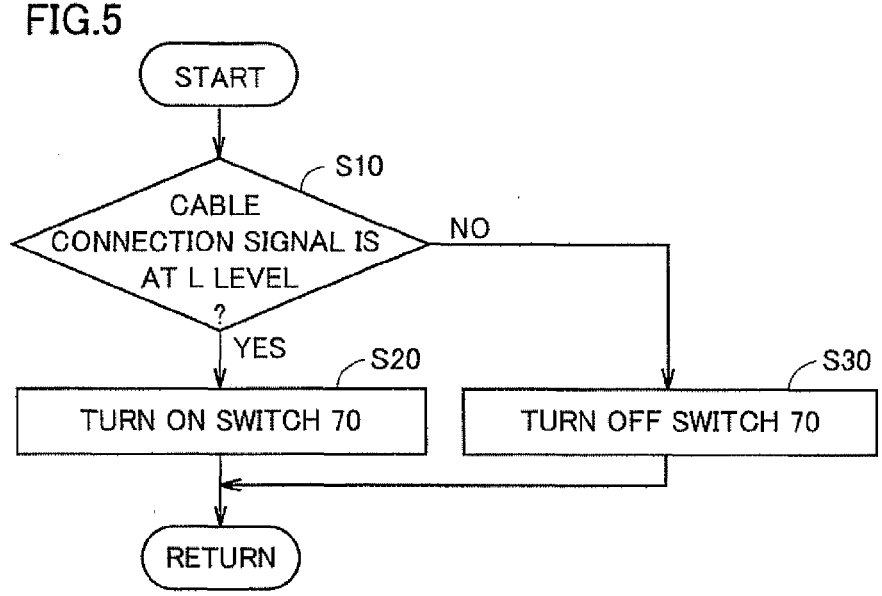
FIG. 5 is a flow chart of a control operation by ECU illustrated in FIG. 4.

FIG. 5 is a flow chart of the control operation by ECU 72. The processing steps illustrated in the flow chart are carried out at certain time intervals or every time when predetermined conditions are met. Referring to FIG. 5, ECU 72 determines whether or not cable connection signal PISW is at L level (Step S10). When ECU 72 determines that cable connection signal PISW is at L level (Yes in Step S10), it is determined that conversion adaptor 20 is presently connected to charge cable 10. Accordingly, ECU 72 turns on switch 70 (Step S20). Then, the potential of plot signal CPLT becomes equal to V2, and relays RY1 in charge cable 10 are switched on, allowing electric power from power source 90 to be supplied to conversion adaptor 20 by way of charge able 10.

When ECU 72 determines in Step S10 that cable connection signal PISW is at H level (No in Step S10), it is determined that conversion adaptor 20 is presently not connected to charge cable 10. Accordingly, ECU 72 turns off switch 70 (Step S30). Then, the potential of plot signal CPLT becomes equal to V1, and relays RY1 in charge cable 10 are switched off. Thus, electric power from power supply 90 is cut off by relays RY1, and no voltage is generated in connector 12 of charge cable 10.

Figure 6:
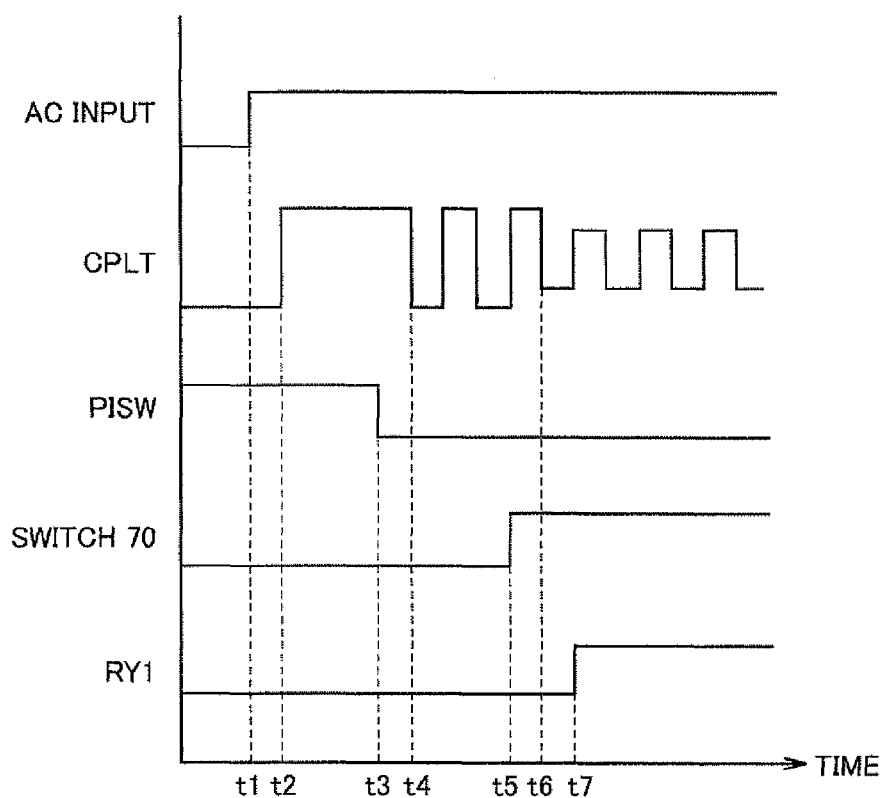
FIG. 6 is a timing chart of main signals.

FIG. 6 is a timing chart of main signals. Referring to FIG. 6, plug 16 of charge cable 10 is connected to power source 90 at a time point t1, and an alternate current is thereby inputted to charge cable 10. Then, CCID 14 of charge cable 10 is activated in response to electric power supplied from power source 90 at a time point t2, and pilot signal CPLT is generated. At the time, conversion adapter 20 and charge cable 10 are disconnected with no oscillation of pilot signal CPLT.

At a time point t3 when conversion adaptor 20 is connected to charge cable 10, cable connection signal PISW shifts to L level. Further, an output line of pilot signal CPLT extending from CCID 14 is electrically connected to resistor circuit 65 of conversion adaptor 20 through pilot signal contact point 45. Then, pilot signal CPLT starts its oscillation at a time point t4.

With cable connection signal PISW having shifted to L level, switch 70 of resistor circuit 65 is turned on by ECU 72 at a time point t5, and the potential of pilot signal CPLT changes from V1 to V2 at a time point t6, This potential change of pilot signal CPLT is detected by voltage sensor 56 of CCID 14, and relays RY1 of charge cable 10 are switched on at a time point t7.

According to the first embodiment described so far, charge cable 10 includes CCID 14 configured to be controllable by the controller mounted on the electrically-powered vehicle. The potential of pilot signal CPLT is manipulated by manipulating unit 60 of conversion adaptor 20 when conversion adaptor 20 is connected to connector 12 of charge cable 10, and relays RY1 of CCID 14 are then switched on. Accordingly, charge cable 10 can be electrically conducted. According to the first embodiment, therefore, standardized charge cable 10 used for charging the power storage device mounted on the electrically-powered vehicle using the power source provided outside of the vehicle can be utilized as a universal cable for transmitting electric power to electric loads such as electric home appliances.

Modified Embodiment

According to the first embodiment, switch 70 is turned on or off in response to cable connection signal PISW so that the potential of pilot signal CPLT is manipulated, however, switch 70 may be turned on or off based on whether or not pilot signal CPLT is detected. When pilot signal CPLT is detected, it is determined that conversion adaptor 20 is connected to charge cable 10 connected to power source 90, and switch 70 is then turned on.

Figure 7:
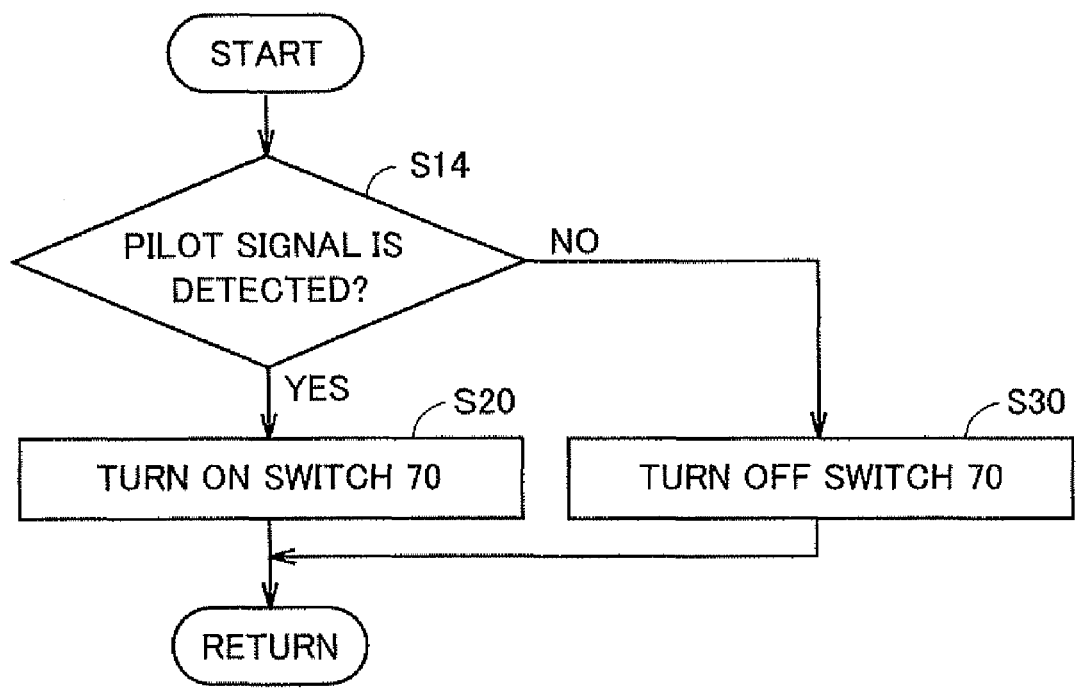
FIG. 7 is a flow chart of a control operation by the ECU according to a modified embodiment of a first embodiment.

FIG. 7 is a flow chart of the control operation by the ECU according to the modified embodiment of the first embodiment. The processing steps illustrated in this flow chart are also carried out at certain time intervals or every time when predetermined conditions are met. Referring to FIG. 7, the flow chart illustrated therein includes Step S14 in place of Step S14 in the flow chart of FIG. 5.

ECU 72 of conversion adaptor 20 determines whether or not pilot signal CPLT was detected (Step S14). When it is determined that pilot signal CPLT was detected (Yes in Step S14), the operation proceeds to Step S20, and switch 70 is turned on. Accordingly, the potential of pilot signal CPLT shifts to V2, and relays RY1 are switched on in charge cable 10.

When it is determined in Step S14 that pilot signal CPLT was not detected (No in Step S14), the operation proceeds to Step S30, and switch 70 is turned off. Accordingly, the potential of pilot signal CPLT shifts to V1, and relays RY1 are switched off in charge cable 10.

Second Embodiment

According to the second embodiment of the present invention, an overcurrent detection feature is provided in the conversion adaptor, and relays RY1 of charge cable 10 are switched off in the case where an overcurrent is detected.

Figure 8:
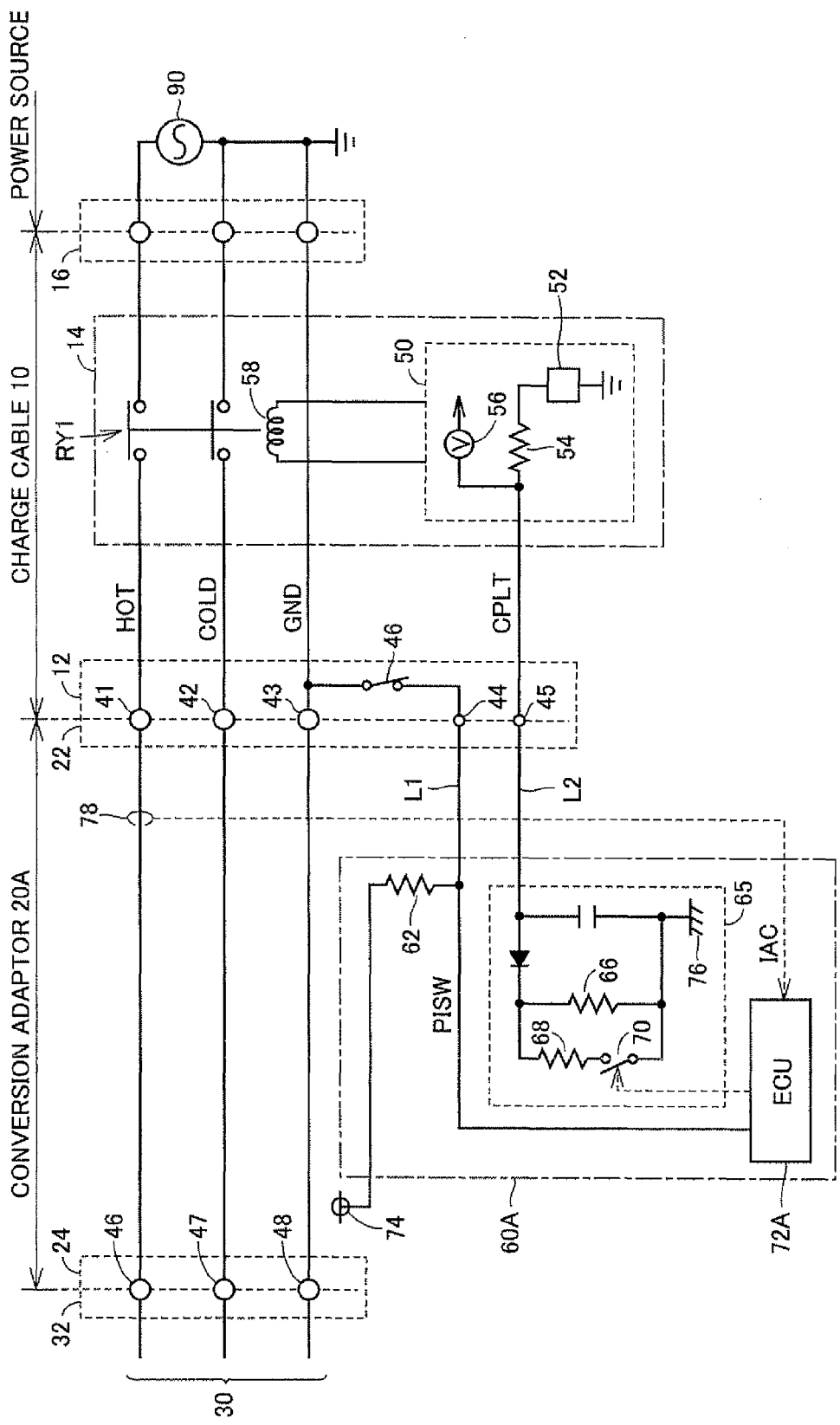
FIG. 8 is a diagram illustrating a construction of a conversion adaptor according to a second embodiment.

FIG. 8 is a diagram illustrating a construction of a conversion adaptor according to the second embodiment, Referring to FIG. 8, a conversion adaptor 20A further includes a current sensor 78 and includes a manipulating unit 60A in place of manipulating unit 60 in the construction of conversion adaptor 20 according to the first embodiment illustrated in FIG. 4. Manipulating unit 60A includes an ECU 72A in place of ECU 72 in the construction of manipulating unit 60.

Current sensor 78 detects a current IAC flowing through the HOT line and outputs a detected value of the current to ECU 72A. Alternatively, current sensor 78 may detect a current flow in the COLD line. ECU 72A receives the detected value of current IAC detected by current sensor 78. Then, ECU 72A turns off switch 70 with current IAC exceeding a predetermined upper-limit value that indicates that current IAC is an overcurrent, making the potential of pilot signal CPLT down to V1. As a result, relays RY1 of charge cable 10 are switched off.

The rest of the construction of ECU 72A is the same as that of ECU 72 according to the first embodiment. Any constitutive elements of manipulating unit 60A, other than ECU 72A, are the same as those of manipulating unit 60 according to the first embodiment. The construction of charge cable 10 was already described in the first embodiment.

Figure 9:
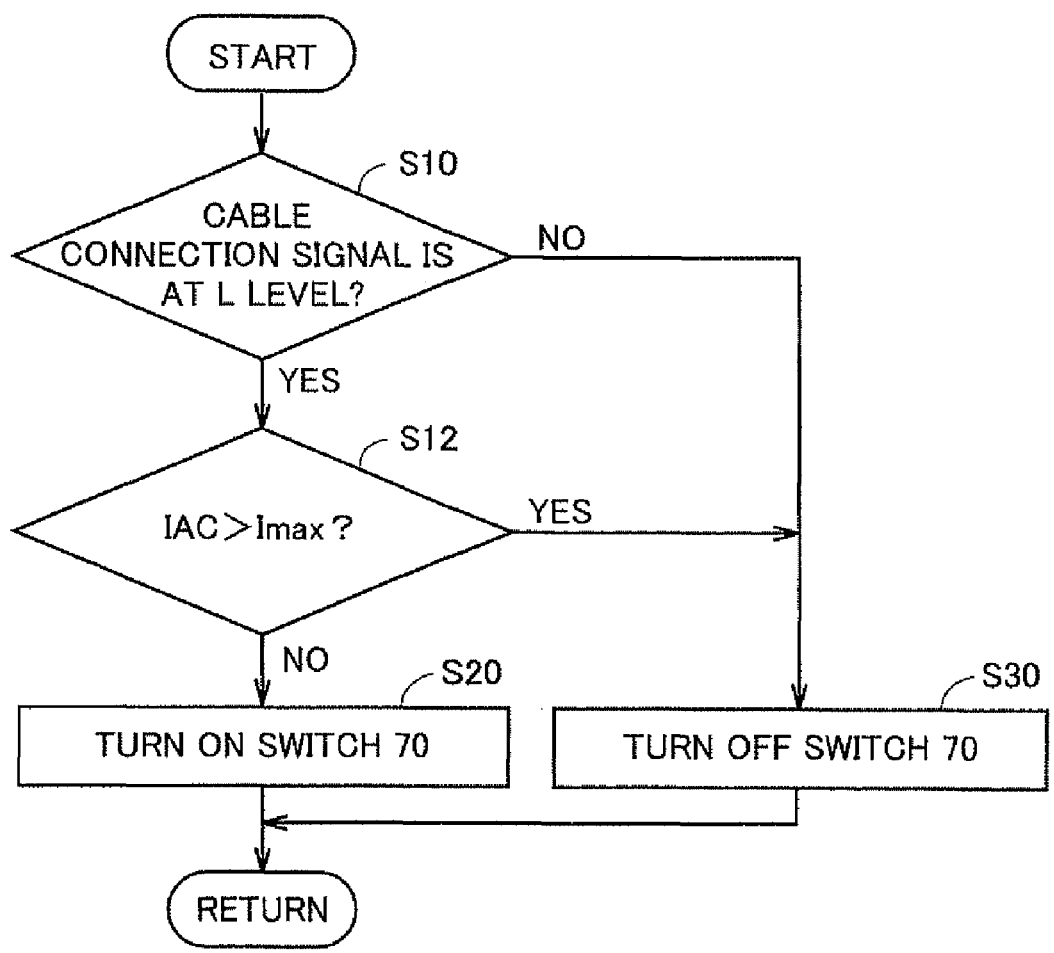
FIG. 9 is a flow chart of a control operation by ECU illustrated in FIG. 8.

FIG. 9 is a flow chart of the control operation by ECU 72A illustrated in FIG. 8. The processing steps illustrated in the flow chart are also carried out at certain time intervals or every time when predetermined conditions are met. Referring to FIG. 9, the flow chart illustrated therein further includes Step S12 in the flow chart of FIG. 5.

When it is determined in Step S10 that cable connection signal PISW is at L level (Yes in Step S10), ECU 72A determines whether or not current IAC detected by current sensor 78 is larger than a predetermined upper-limit value Imax (Step S12). Upper-limit value Imax is used to determine if current IAC is an overcurrent.

When it is determined in Step S12 that current IAC is at most upper-limit value Imax (No in Step S12), ECU 72A advances the operation to Step S20, and switch 70 is then turned on. When it is determined in Step S12 that current IAC is larger than upper-limit value Imax (Yes in Step S12), ECU 72A advances the operation to Step S30, and switch 70 is then turned off. Thus, switch 70 is turned off in the case where the overcurrent is detected. Then, the potential of pilot signal CPLT results in V1, and relays RY1 of charge cable 10 are switched off.

According to the second embodiment described so far, the potential of pilot signal CPLT is manipulated by manipulating unit 60A of conversion adaptor 20A in the case where the overcurrent is detected in conversion adaptor 20A, and relays RY1 of CCID 14 are switched off so that the supply of power is blocked. The second embodiment, therefore, can prevent such an overcurrent from causing damage to charge cable 10 and conversion adaptor 20A.

Third Embodiment

According to the third embodiment of the present invention, the electric power line in the conversion adaptor is also provided with a relay.

Figure 10:
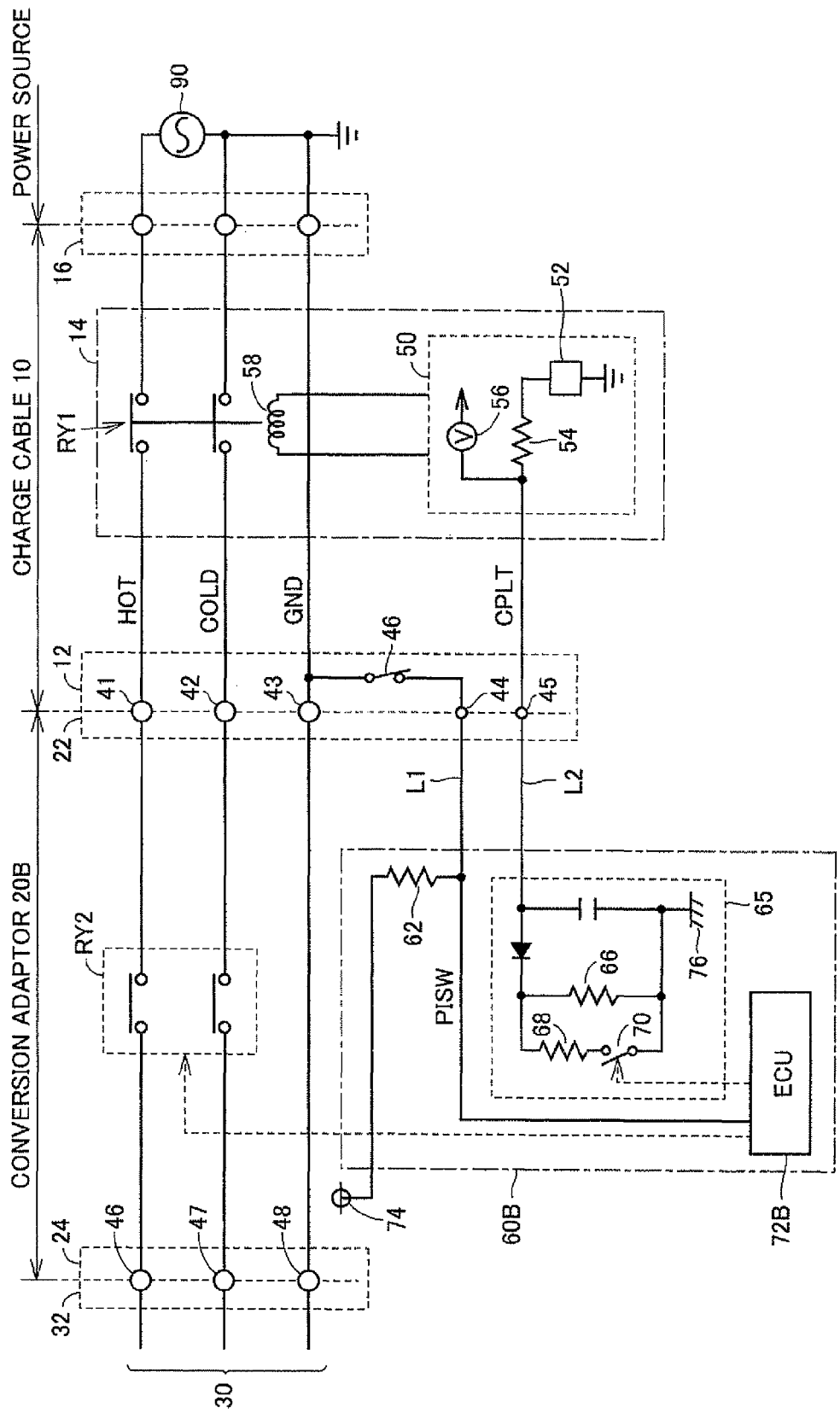
FIG. 10 is a diagram illustrating a construction of a conversion adaptor according to a third embodiment.

FIG. 10 is a diagram illustrating a construction of a conversion adaptor according to the third embodiment. Referring to FIG. 10, a conversion adaptor 20B further includes relays RY2 and includes a manipulating unit 60B in place of manipulating unit 60 in the construction of conversion adaptor 20 according to the first embodiment illustrated in FIG. 4. Manipulating unit 60B includes an ECU 72B in place of ECU 72 in the construction of manipulating unit 60.

Relays RY2 are respectively provided on a HOT line and a COLD line of conversion adaptor 20B. Relays RY2 are switched on or off by ECU 72B. Electric power inputted from primary side connector unit 22 is cut off with relays RY2 switched off, and electric power inputted from primary side connector unit 22 is supplied to secondary side connector unit 24 with relays RY2 switched on.

ECU 72B turns off switch 70 and switches off relays RY2 when cable connection signal PISW is at H level, in other words, when conversion adaptor 20B and charge cable 10 are disconnected. ECU 72B turns on switch 70 and switches on relays RY2 when cable connection signal PISW is at L level, in other words, when conversion adaptor 20B is connected to charge cable 10. ECU 72B thus turns on or off based on cable connection signal PISW to thereby manipulate relays RY1 of charge cable 10 and also manipulate relays RY2 provided in conversion adaptor 20B. As a result, conversion adaptor 20B can ensure an improved safety.

Though not particularly shown, relays RY2 may be manipulated together with relays RY1 based on whether or not the pilot signal is detected in place of cable connection signal PISW as described in the modified embodiment of the first embodiment.

In the case where current sensor 78 is provided in a manner similar to the second embodiment and an overcurrent is thereby detected, relays RY2 may be switched of as well as flipping off switch 70.

According to the third embodiment described so far, relays RY2 are provided in conversion adaptor 20B, and relays RY2 are manipulated in addition to relays RY1 of charge cable 10. Therefore, the third embodiment can further improves the safety of conversion adaptor 20B.

Fourth Embodiment

Figure 11:
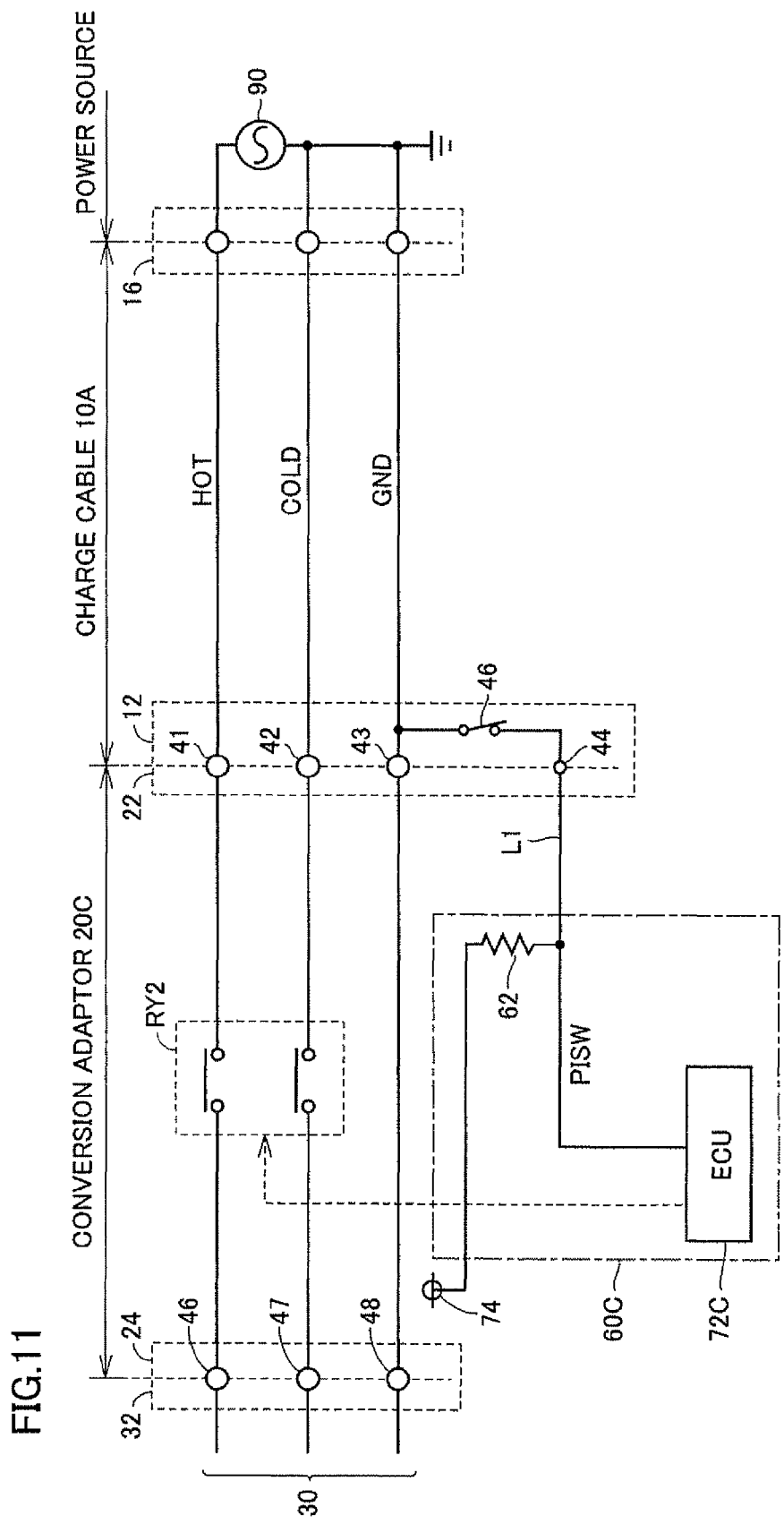
FIG. 11 is a diagram illustrating constructions of a charge cable and a conversion adapter according to a fourth embodiment.

FIG. 11 is a diagram illustrating constructions of a charge cable and a conversion adapter according to the fourth embodiment of the present invention, Referring to FIG. 11, a charge cable 10A has a construction such that CCID 14 is removed from the construction of charge cable 10 illustrated in FIG. 4, meaning that charge cable 10A does not have a relay for blocking power supply.

A conversion adaptor 20C further includes relays RY2 and includes a manipulating unit 60C in place of manipulating unit 60 in the construction of conversion adaptor 20 illustrated in FIG. 4. Manipulating unit 60C does not include resistor circuit 65 and includes an ECU 72C in place of ECU 72 in the construction of manipulating unit 60.

ECU 72C switches off relays RY2 when cable connection signal PISW is at H level, in other words, when conversion adaptor 20C and charge cable 10 are disconnected. ECU 72C switches on relays RY2 when cable connection signal PISW is at L level, in other words, when conversion adaptor 20C is connected to charge cable 10. Thus, ECU 72C manipulates relays RY2 in accordance with the level of cable connection signal PISW.

Figure 12:
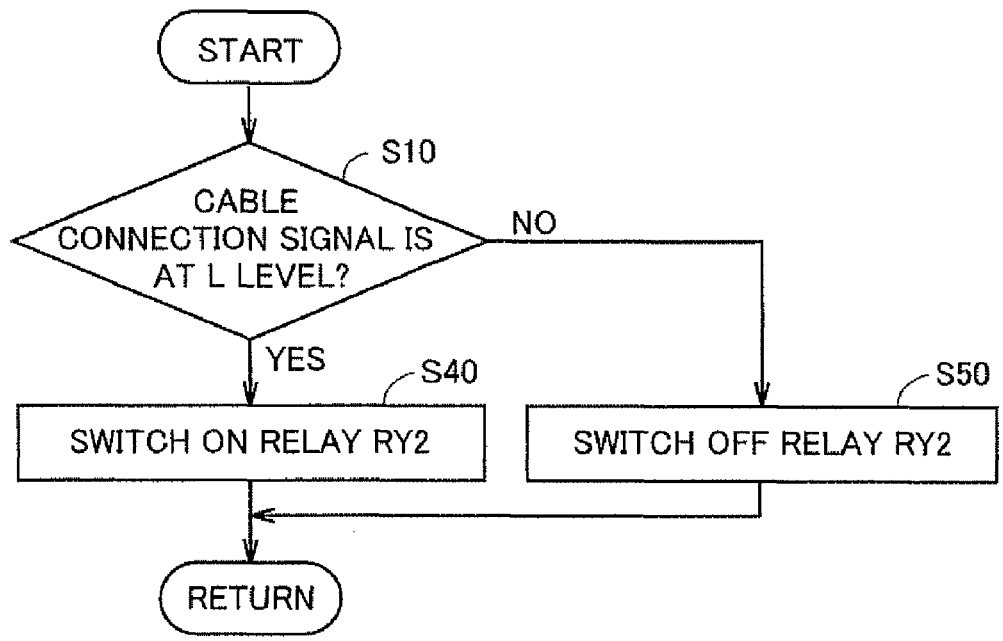
FIG. 12 is a flow chart of a control operation by ECU illustrated in FIG. 11.

FIG. 12 is a flow chart of the control operation by the ECU illustrated in FIG. 11. The processing steps illustrated in the flow chart are also carried out at certain time intervals or every time when predetermined conditions are met. Referring to FIG. 12, the flow chart illustrated therein includes Steps S40 and S50 in place of Steps S20 and S30 in the flow chart of FIG. 5.

When it is determined in Step S10 that cable connection signal PISW is at L level (Yes in Step S10), ECU 72 switches on relays RY2 (Step S40). Accordingly, electric power inputted from primary side connector unit 22 is outputted from secondary side connector unit 24.

When it is determined in Step S10 that cable connection signal PISW is at H level (No in Step S10), ECU 72 switches off relays RY2 (Step S50). Accordingly, electric power inputted from primary side connector unit 22 is blocked, preventing voltage generation in secondary side connector unit 24.

Though not particularly shown, current sensor 78 may be provided in a manner similar to the second embodiment so that relays RY2 are switched off in the case where an overcurrent is thereby detected.

According to the fourth embodiment described so far, conversion adaptor 20C can cut off electric power in the case where the charge cable includes no relay.

Fifth Embodiment

According to the fifth embodiment of the present invention, a switch that can be manipulated by a user is provided in a conversion adaptor, and relays RY1 of charge cable 10 are not switched on unless the switch is turned on. Putting it differently, the user can switch on or off relays RY1 of charge cable 10 using the switch provided in the conversion adaptor connected to charge cable 10.

Figure 13:
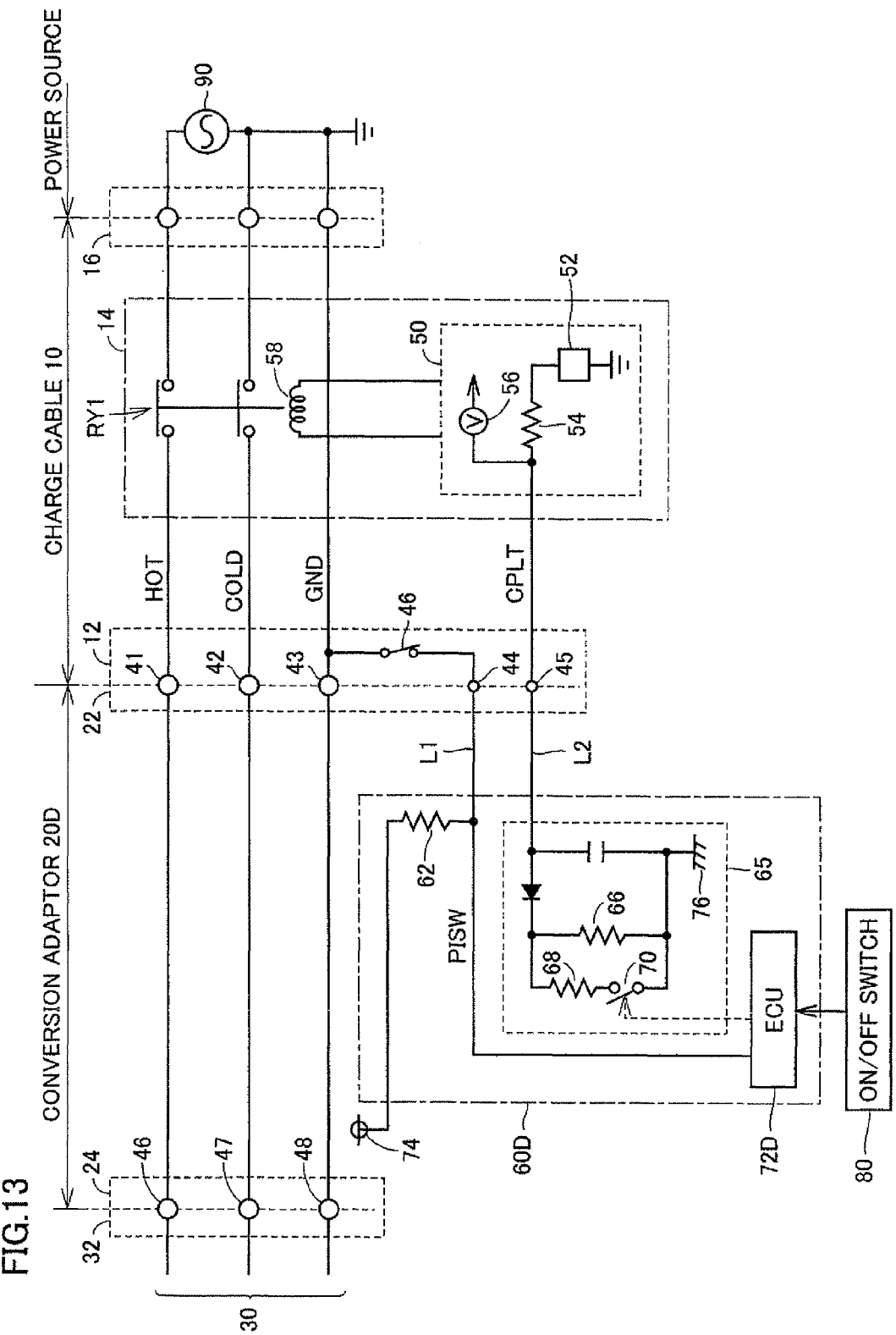
FIG. 13 is a diagram illustrating a construction of a conversion adaptor according to a fifth embodiment.

FIG. 13 is a diagram illustrating a construction of the conversion adaptor according to the fifth embodiment. Referring to FIG. 13, a conversion adaptor 20D further includes an on/off switch 80 and includes a manipulating unit 60D in place of manipulating unit 60 in the construction of conversion adaptor 20 according to the first embodiment illustrated in FIG. 4. Manipulating unit 60D includes an ECU 72D in place of ECU 72 in the construction of manipulating unit 60.

On/off switch 80 can be manipulated by a user. A signal outputted to ECU 72D shifts to H level when the switch is manipulated to be on (when the switch is turned on), and the signal outputted to ECU 72D shifts to L level when the switch is manipulated to be off (when the switch is turned off).

ECU 72D turns off switch 70 when the signal of on/off switch 80 is at L level. More specifically, ECU 72 turns off switch 70 with on/off switch 80 manipulated to be off irrespective of cable connection signal PISW. When the signal of on/off switch 80 is at H level, ECU 72 turns on switch 70 with cable connection signal PISW indicating L level (connected), while flipping off switch 70 with cable connection signal PISW indicating H level (disconnected).

The rest of the construction of ECU 72D is the same as that of ECU 72 according to the first embodiment. Any constitutive elements of manipulating unit 60D, other than ECU 72D, are the same as those of manipulating unit 60 according to the first embodiment. The construction of charge cable 10 was already described in the first embodiment.

FIG. 14 is a flow chart of a control operation by ECU 72D illustrated in FIG. 13. The processing steps illustrated in this flow chart are also carried out at certain time intervals or every time when predetermined conditions are met. Referring to FIG. 14, the flow chart illustrated therein further includes Step S16 in the flow chart of FIG. 5.

When it is determined in Step S10 that cable connection signal PISW is at L level (Yes in Step S10), ECU 72D determines whether or not on/off switch 80 (FIG. 13) is on (Step S16).

When it is determined in Step S16 that on/off switch 80 is on (Yes in Step S16), ECU 72D advances the operation to Step S20, and switch 70 is then turned on. When it is determined in Step S16 that on/off switch 80 is off (No in Step S16), ECU 72D advances the operation to Step S30, and switch 70 is then turned off. Even when charge cable 10 and conversion adaptor 20D are connected to each other, switch 70 is still turned off as far as on/off switch 80 of conversion adaptor 20D is manipulated to be off. As a result, relays RY1 of charge cable 10 are switched off.

Though not particularly shown, relays RY2 may be manipulated together with relays RY1 based on whether or not the pilot signal is detected in place of cable connection signal PISW as described in the modified embodiment of the first embodiment. Further, current sensor 78 may be provided in a manner similar to the second embodiment so that switch 70 is turned off in the case where an overcurrent is thereby detected. Relays RY2 may be provided in conversion adaptor 20D in a manner similar to the third embodiment, wherein relays RY2 are switched off as soon as on/off switch 80 is manipulated to be off.

According to the fifth embodiment described so far, wherein user-operable on/off switch 80 is provided in conversion adaptor 20D, the relays can be manipulated by using on/input switch 80.

In the embodiments described so far, a lock mechanism for locking the connection of connector 12 of charge cable 10 (10A) may be provided so that switch 70 is turned off to switch off relays RY1 when the lock of the lock mechanism is released. The construction thus provided can prevent the occurrence of unexpected removal of the charge cable connector from the conversion adaptor during the use of the conversion adaptor.

In the description given so far, primary side connector unit 22 corresponds to "a first connector unit" according to the present invention, and secondary side connector unit 24 corresponds to "a second connector unit" according to the present invention. CCID 14 of charge cable 10 corresponds to "a power cutoff device" according to the present invention, and relay RY1 of CCID 14 corresponds to "a relay" according to the present invention. ECU 72 corresponds to "a controller" according to the present invention, and limit switch 46 corresponds to "a signal generator" according to the present invention. Current sensor 78 corresponds to "a current detector" according to the present invention, and on/off switch 80 corresponds to "a switch" according to the present invention.

The embodiments disclosed in this specification are merely the illustration of examples in all aspects and should not restrict the present invention by any means. The scope of the present invention is based on not the description of embodiments but the appended scope of claims, and it is intended to cover all of such modifications as fall within the scope of the appended claims and the meaning and scope of equivalent.

The invention claimed is:

1. A plug conversion adaptor for enabling utilization of a standardized charge cable used when a power storage device mounted on an electrically-powered vehicle is charged by a power source provided outside of the vehicle as a universal cable for transmitting electric power to an electric load having a plug differently formed according to regionally different standards, said charge cable including a power cutoff device configured to be controllable by a controller mounted on said electrically-powered vehicle, comprising:

a first connector unit configured to be connectable to a connector of said charge cable;
   a second connector unit configured to receive the plug of said electric load; and
   a manipulating unit for manipulating said power cutoff device to shift to a non-cutoff state when the connector of said charge cable is connected to said first connector unit.

2. The plug conversion adaptor according to claim 1, wherein
   said power cutoff device includes
   a relay provided in an electric power line; and
   an EVSE controller configured to generate a standardized pilot signal and output the generated pilot signal to said electrically-powered vehicle by way of said charge cable,
   said manipulating unit includes
   a resistor circuit connected to a control pilot line to which said pilot signal is transmitted, and configured to be able to change a potential of said pilot signal; and
   a controller for controlling said resistor circuit so as to change the potential of said pilot signal to be different to a potential thereof in a disconnected state when the connector of said charge cable is connected to said first connector unit, and
   said EVSE controller switches on said relay upon detection of the potential change of said pilot signal resulting from the connection of the connector of said charge cable to said first connector unit.

3. The plug conversion adaptor according to claim 2, wherein
   said charge cable further includes a signal generator for generating a connection signal indicating the connection state of said connector, and
   said controller receives said connection signal, and determines whether or not the connector of said charge cable is connected to said first connector unit based on the connection signal thereby received.

4. The plug conversion adaptor according to claim 2, wherein
   said controller determines whether or not the connector of said charge cable is connected to said first connector unit based on whether or not said pilot signal is detected.

5. The plug conversion adaptor according to claim 1, further comprising a current detector for detecting a current inputted from said first connector unit, wherein
   said manipulating unit manipulates said power cutoff device so as to shift to a cutoff state in response to detection of an overcurrent based on the current detected by said current detector.

6. The plug conversion adaptor according to claim 1, wherein
   said charge cable further includes a lock mechanism for locking the connection of said connector, and
   said manipulating unit manipulates said power cutoff device so as to shift to a cutoff state when the lock by said lock mechanism is released.

7. The plug conversion adaptor according to claim 1, further comprising a switch which can be turned on/off by a user, wherein
   said manipulating unit manipulates said power cutoff device so as to shift to the non-cutoff state when the connector of said charge cable is connected to said first connector unit and said switch is turned on.

8. The plug conversion adaptor according to claim 1, further comprising a relay configured to enable electric power inputted from said first connector unit to be cut off, wherein
   said manipulating unit switches on said relay when the connector of said charge cable is connected to said first connector unit.

* * * * *